(12) United States Patent
Crump et al.

(10) Patent No.: US 12,514,294 B2
(45) Date of Patent: Jan. 6, 2026

(54) 3D-PRINTED SUBSTRATE FOR AEROSOL DELIVERY DEVICE

(71) Applicant: NICOVENTURES TRADING LIMITED, London (GB)

(72) Inventors: Bridget B. Crump, Greensboro, NC (US); Stephen B. Sears, Siler City, NC (US)

(73) Assignee: NICOVENTURES TRADING LIMITED, London (GB)

( * ) Notice: Subject to any disclaimer, the term of this patent is extended or adjusted under 35 U.S.C. 154(b) by 1065 days.

(21) Appl. No.: 16/918,443

(22) Filed: Jul. 1, 2020

(65) Prior Publication Data

US 2022/0000178 A1 Jan. 6, 2022

(51) Int. Cl.
*A24F 13/00* (2006.01)
*A24F 40/465* (2020.01)
*A24F 40/50* (2020.01)
*H05B 6/10* (2006.01)
*B33Y 80/00* (2015.01)

(52) U.S. Cl.
CPC ............ *A24F 40/465* (2020.01); *A24F 40/50* (2020.01); *H05B 6/105* (2013.01); *B33Y 80/00* (2014.12)

(58) Field of Classification Search
CPC ....................................................... A24F 47/00
USPC .................................................. 131/328–329
See application file for complete search history.

(56) References Cited

U.S. PATENT DOCUMENTS

| | | |
|---|---|---|
| 1,514,682 A | 11/1924 | Wilson |
| 1,541,577 A | 6/1925 | Johnson |
| 1,771,366 A | 7/1930 | Wyss |
| 2,057,353 A | 10/1936 | Whitemore, Jr. |
| 2,104,266 A | 1/1938 | Mccormick |
| 3,200,819 A | 8/1965 | Gilbert |
| 3,479,561 A | 11/1969 | Janning |
| 4,284,089 A | 8/1981 | Ray |

(Continued)

FOREIGN PATENT DOCUMENTS

| | | |
|---|---|---|
| CN | 1541577 | 11/2004 |
| CN | 2719043 | 11/2004 |

(Continued)

OTHER PUBLICATIONS

International Search Report mailed Nov. 30, 2021 in the corresponding International Application No. PCT/IB2021/055887, 7 pages.

*Primary Examiner* — Phuong K Dinh
(74) *Attorney, Agent, or Firm* — Womble Bond Dickinson (US) LLP; Flynt Strean

(57) ABSTRACT

An aerosol source member for use with an inductive heating aerosol delivery device, a method of manufacturing an aerosol source member for use with an inductive heating aerosol delivery device, and an aerosol delivery device are provided. The aerosol source member comprises a substrate portion comprising at least one substrate material and at least one resonant receiver comprising at least one susceptor material. At least a portion of the resonant receiver is configured to be positioned within a control body of the aerosol delivery device, the control body comprising at least one resonant transmitter, the susceptor material is configured to be inductively heated by the at least one resonant transmitter, and the substrate portion is formed using additive manufacturing.

10 Claims, 8 Drawing Sheets

(56) References Cited

U.S. PATENT DOCUMENTS

| | | | |
|---|---|---|---|
| 4,303,083 A | 12/1981 | Burruss, Jr. | |
| 4,735,217 A | 4/1988 | Gerth et al. | |
| 4,848,374 A | 7/1989 | Chard et al. | |
| 4,907,606 A | 3/1990 | Lilja et al. | |
| 4,922,901 A | 5/1990 | Brooks et al. | |
| 4,945,931 A | 8/1990 | Gori | |
| 4,947,874 A | 8/1990 | Brooks et al. | |
| 4,947,875 A * | 8/1990 | Brooks ................ | A61M 15/00 131/194 |
| 4,986,286 A | 1/1991 | Roberts et al. | |
| 5,019,122 A | 5/1991 | Clearman et al. | |
| 5,042,510 A | 8/1991 | Curtiss et al. | |
| 5,060,671 A | 10/1991 | Counts et al. | |
| 5,093,894 A | 3/1992 | Deevi et al. | |
| 5,101,839 A | 4/1992 | Jakob et al. | |
| 5,144,962 A | 9/1992 | Counts et al. | |
| 5,249,586 A | 10/1993 | Morgan et al. | |
| 5,261,424 A | 11/1993 | Sprinkel, Jr. | |
| 5,322,075 A | 6/1994 | Deevi et al. | |
| 5,353,813 A | 10/1994 | Deevi et al. | |
| 5,369,723 A | 11/1994 | Counts et al. | |
| 5,372,148 A | 12/1994 | McCafferty et al. | |
| 5,388,574 A | 2/1995 | Ingebrethsen | |
| 5,408,574 A | 4/1995 | Deevi et al. | |
| 5,468,936 A | 11/1995 | Deevi et al. | |
| 5,498,850 A | 3/1996 | Das | |
| 5,515,842 A | 5/1996 | Ramseyer et al. | |
| 5,530,225 A | 6/1996 | Hajaligol | |
| 5,564,442 A | 10/1996 | MacDonald et al. | |
| 5,598,868 A | 2/1997 | Jakob et al. | |
| 5,649,554 A | 7/1997 | Sprinkel et al. | |
| 5,666,977 A | 9/1997 | Higgins et al. | |
| 5,687,746 A | 11/1997 | Rose et al. | |
| 5,697,385 A | 12/1997 | Seymour et al. | |
| 5,726,421 A | 3/1998 | Fleischhauer et al. | |
| 5,727,571 A | 3/1998 | Meiring et al. | |
| 5,743,251 A | 4/1998 | Howell et al. | |
| 5,799,663 A | 9/1998 | Gross et al. | |
| 5,819,756 A | 10/1998 | Mielordt | |
| 5,865,185 A | 2/1999 | Collins et al. | |
| 5,865,186 A | 2/1999 | Volsey, II | |
| 5,878,752 A | 3/1999 | Adams et al. | |
| 5,894,841 A | 4/1999 | Voges | |
| 5,934,289 A | 8/1999 | Watkins et al. | |
| 5,954,979 A | 9/1999 | Counts et al. | |
| 5,967,148 A | 10/1999 | Harris et al. | |
| 6,040,560 A | 3/2000 | Fleischhauer et al. | |
| 6,053,176 A | 4/2000 | Adams et al. | |
| 6,089,857 A | 7/2000 | Matsuura et al. | |
| 6,095,153 A | 8/2000 | Kessler et al. | |
| 6,125,853 A | 10/2000 | Susa et al. | |
| 6,155,268 A | 12/2000 | Takeuchi | |
| 6,164,287 A | 12/2000 | White | |
| 6,196,218 B1 | 3/2001 | Voges | |
| 6,196,219 B1 | 3/2001 | Hess et al. | |
| 6,598,607 B2 | 7/2003 | Adiga et al. | |
| 6,601,776 B1 | 8/2003 | Oljaca et al. | |
| 6,615,840 B1 | 9/2003 | Fournier et al. | |
| 6,688,313 B2 | 2/2004 | Wrenn et al. | |
| 6,772,756 B2 | 8/2004 | Shayan | |
| 6,803,545 B2 | 10/2004 | Blake et al. | |
| 6,854,461 B2 | 2/2005 | Nichols et al. | |
| 6,854,470 B1 | 2/2005 | Pu | |
| 7,117,867 B2 | 10/2006 | Cox et al. | |
| 7,293,565 B2 | 11/2007 | Griffin et al. | |
| 7,513,253 B2 | 4/2009 | Kobayashi et al. | |
| 7,775,459 B2 | 8/2010 | Martens, III et al. | |
| 7,832,410 B2 | 11/2010 | Hon | |
| 7,845,359 B2 | 12/2010 | Montaser | |
| 7,896,006 B2 | 3/2011 | Hamano et al. | |
| 8,127,772 B2 | 3/2012 | Montaser | |
| 8,314,591 B2 | 11/2012 | Terry et al. | |
| 8,365,742 B2 | 2/2013 | Hon | |
| 8,402,976 B2 | 3/2013 | Fernando et al. | |
| 8,499,766 B1 | 8/2013 | Newton | |
| 8,528,569 B1 | 9/2013 | Newton | |
| 8,550,069 B2 | 10/2013 | Alelov | |
| 8,851,081 B2 | 10/2014 | Fernando et al. | |
| 9,078,473 B2 | 7/2015 | Worm et al. | |
| 9,717,277 B2 | 8/2017 | Mironov | |
| 9,788,571 B2 | 10/2017 | Conner et al. | |
| 2002/0146242 A1 | 10/2002 | Vieira | |
| 2003/0226837 A1 | 12/2003 | Blake et al. | |
| 2004/0118401 A1 | 6/2004 | Smith et al. | |
| 2004/0129280 A1 | 7/2004 | Woodson et al. | |
| 2004/0200488 A1 | 10/2004 | Felter et al. | |
| 2004/0226568 A1 | 11/2004 | Takeuchi et al. | |
| 2005/0016550 A1 | 1/2005 | Katase | |
| 2006/0016453 A1 | 1/2006 | Kim | |
| 2006/0196518 A1 | 9/2006 | Hon | |
| 2007/0074734 A1 | 4/2007 | Braunshteyn et al. | |
| 2007/0102013 A1 | 5/2007 | Adams et al. | |
| 2007/0215167 A1 | 9/2007 | Llewellyn Crooks et al. | |
| 2008/0085103 A1 | 4/2008 | Beland et al. | |
| 2008/0092912 A1 | 4/2008 | Robinson et al. | |
| 2008/0257367 A1 | 10/2008 | Paterno et al. | |
| 2008/0276947 A1 | 11/2008 | Martzel | |
| 2008/0302374 A1 | 12/2008 | Wengert et al. | |
| 2009/0095311 A1 | 4/2009 | Han | |
| 2009/0095312 A1 | 4/2009 | Herbrich et al. | |
| 2009/0126745 A1 | 5/2009 | Hon | |
| 2009/0188490 A1 | 7/2009 | Han | |
| 2009/0230117 A1 | 9/2009 | Fernando et al. | |
| 2009/0272379 A1 | 11/2009 | Thorens et al. | |
| 2009/0283103 A1 | 11/2009 | Nielsen et al. | |
| 2009/0320863 A1 | 12/2009 | Fernando et al. | |
| 2010/0043809 A1 | 2/2010 | Magnon | |
| 2010/0083959 A1 | 4/2010 | Siller | |
| 2010/0200006 A1 | 8/2010 | Robinson et al. | |
| 2010/0229881 A1 | 9/2010 | Hearn | |
| 2010/0242974 A1 | 9/2010 | Pan | |
| 2010/0307518 A1 | 12/2010 | Wang | |
| 2010/0313901 A1 | 12/2010 | Fernando et al. | |
| 2011/0005535 A1 | 1/2011 | Xiu | |
| 2011/0011396 A1 | 1/2011 | Fang | |
| 2011/0036363 A1 | 2/2011 | Urtsev et al. | |
| 2011/0036365 A1 | 2/2011 | Chong et al. | |
| 2011/0094523 A1 | 4/2011 | Thorens et al. | |
| 2011/0126848 A1 | 6/2011 | Zuber et al. | |
| 2011/0155153 A1 | 6/2011 | Thorens et al. | |
| 2011/0155718 A1 | 6/2011 | Greim et al. | |
| 2011/0168194 A1 | 7/2011 | Hon | |
| 2011/0265806 A1 | 11/2011 | Alarcon et al. | |
| 2011/0290248 A1 | 12/2011 | Schennum | |
| 2011/0309157 A1 | 12/2011 | Yang et al. | |
| 2012/0042885 A1 | 2/2012 | Stone et al. | |
| 2012/0060853 A1 | 3/2012 | Robinson et al. | |
| 2012/0111347 A1 | 5/2012 | Hon | |
| 2012/0132643 A1 | 5/2012 | Choi et al. | |
| 2012/0227752 A1 | 9/2012 | Alelov | |
| 2012/0231464 A1 | 9/2012 | Yu et al. | |
| 2012/0260927 A1 | 10/2012 | Liu | |
| 2012/0279512 A1 | 11/2012 | Hon | |
| 2012/0318882 A1 | 12/2012 | Abehasera | |
| 2013/0037041 A1 | 2/2013 | Worm et al. | |
| 2013/0056013 A1 | 3/2013 | Terry et al. | |
| 2013/0081625 A1 | 4/2013 | Rustad et al. | |
| 2013/0081642 A1 | 4/2013 | Safari | |
| 2013/0192619 A1 | 8/2013 | Tucker et al. | |
| 2013/0255702 A1 | 10/2013 | Griffith, Jr. et al. | |
| 2013/0306084 A1 | 11/2013 | Flick | |
| 2013/0319439 A1 | 12/2013 | Gorelick et al. | |
| 2013/0340750 A1 | 12/2013 | Thorens et al. | |
| 2013/0340775 A1 | 12/2013 | Juster et al. | |
| 2014/0000638 A1 | 1/2014 | Sebastian et al. | |
| 2014/0060554 A1 | 3/2014 | Collett et al. | |
| 2014/0060555 A1 | 3/2014 | Chang et al. | |
| 2014/0096781 A1 | 4/2014 | Sears et al. | |
| 2014/0096782 A1 | 4/2014 | Ampolini et al. | |
| 2014/0109921 A1 | 4/2014 | Chen | |
| 2014/0157583 A1 | 6/2014 | Ward et al. | |
| 2014/0209105 A1 | 7/2014 | Sears et al. | |
| 2014/0253144 A1 | 9/2014 | Jacob et al. | |
| 2014/0261408 A1 | 9/2014 | DePiano et al. | |

(56) References Cited

U.S. PATENT DOCUMENTS

| | | |
|---|---|---|
| 2014/0261486 A1 | 9/2014 | Potter et al. |
| 2014/0261487 A1 | 9/2014 | Chapman et al. |
| 2014/0261495 A1 | 9/2014 | Jacob et al. |
| 2014/0270727 A1 | 9/2014 | Ampolini et al. |
| 2014/0270729 A1 | 9/2014 | DePiano et al. |
| 2014/0270730 A1 | 9/2014 | DePiano et al. |
| 2014/0345631 A1 | 11/2014 | Bowen et al. |
| 2015/0007838 A1 | 1/2015 | Fernando et al. |
| 2015/0027459 A1 | 1/2015 | Collett et al. |
| 2015/0053217 A1 | 2/2015 | Steingraber et al. |
| 2016/0037826 A1 | 2/2016 | Hearn et al. |
| 2016/0295921 A1 | 10/2016 | Mironov et al. |
| 2017/0055576 A1 | 3/2017 | Beeson et al. |
| 2017/0064996 A1 | 3/2017 | Mironov |
| 2017/0071250 A1 | 3/2017 | Mironov et al. |
| 2017/0079325 A1 | 3/2017 | Mironov |
| 2017/0086508 A1 | 3/2017 | Mironov et al. |
| 2017/0119049 A1 | 5/2017 | Blandino et al. |
| 2017/0119054 A1 | 5/2017 | Zinovik et al. |
| 2017/0164657 A1 | 6/2017 | Batista |
| 2017/0172208 A1 | 6/2017 | Mironov |
| 2018/0317555 A1 | 11/2018 | Blandino et al. |
| 2019/0038553 A1 | 2/2019 | Engqvist |
| 2019/0208827 A1* | 7/2019 | Mironov ............... A24F 40/20 |
| 2020/0120981 A1 | 4/2020 | Yamada |
| 2020/0323271 A1* | 10/2020 | Alizon ................ A61M 15/06 |

FOREIGN PATENT DOCUMENTS

| | | | |
|---|---|---|---|
| CN | 200997909 | 11/2004 | |
| CN | 201379072 | 11/2004 | |
| CN | 101116542 | 2/2008 | |
| CN | 101176805 | 5/2008 | |
| CN | 108348011 A * | 7/2018 | ........... A24B 15/165 |
| CN | 109068741 | * 12/2018 | |
| CN | 109068741 A * | 12/2018 | ........... A24B 15/167 |
| ES | 2800056 T3 * | 12/2020 | ........... A24B 15/167 |
| GB | 2469850 | 11/2010 | |
| WO | WO2004043175 | 5/2004 | |
| WO | WO2004080216 | 9/2004 | |
| WO | WO2005099494 | 10/2005 | |
| WO | WO2007078273 | 7/2007 | |
| WO | WO2007131449 | 11/2007 | |
| WO | WO2009105919 | 9/2009 | |
| WO | WO2009155734 | 12/2009 | |
| WO | WO2010003480 | 1/2010 | |
| WO | WO2010045670 | 4/2010 | |
| WO | WO2010073122 | 7/2010 | |
| WO | WO2010118644 | 10/2010 | |
| WO | WO199748293 | 11/2010 | |
| WO | WO2003034847 | 11/2010 | |
| WO | WO2010140937 | 12/2010 | |
| WO | WO2011010334 | 1/2011 | |
| WO | WO2012072762 | 6/2012 | |
| WO | WO2012100523 | 8/2012 | |
| WO | WO2013089551 | 6/2013 | |
| WO | 2017013164 A1 | 1/2017 | |
| WO | WO2017005705 | 1/2017 | |
| WO | WO 2017/068099 * | 4/2017 | |
| WO | WO2017068092 | 4/2017 | |
| WO | WO2017068093 | 4/2017 | |
| WO | WO2017068094 | 4/2017 | |
| WO | WO-2017068094 A1 * | 4/2017 | ............... A24C 5/01 |
| WO | WO2017068096 | 4/2017 | |
| WO | WO2017068098 | 4/2017 | |
| WO | WO-2017068099 A1 * | 4/2017 | ............... A24B 3/14 |
| WO | WO2017068100 | 4/2017 | |
| WO | WO2017085242 | 5/2017 | |
| WO | WO2017153443 | 9/2017 | |
| WO | WO2017178394 | 10/2017 | |
| WO | 2018138072 A1 | 8/2018 | |
| WO | 2019030277 A1 | 2/2019 | |
| WO | 2019244127 A1 | 12/2019 | |
| WO | 2020079130 A1 | 4/2020 | |

* cited by examiner

3D-PRINTED SUBSTRATE FOR AEROSOL DELIVERY DEVICE

TECHNOLOGICAL FIELD

The present disclosure relates to aerosol source members and aerosol delivery devices and uses thereof for yielding tobacco components or other materials in inhalable form. More particularly, the present disclosure relates to aerosol source members and aerosol delivery devices and systems, such as smoking articles, that utilize electrically-generated heat to heat substrate material, preferably without significant combustion, in order to provide an inhalable substance in the form of an aerosol for human consumption.

BACKGROUND

Many smoking articles have been proposed through the years as improvements upon, or alternatives to, smoking products based upon combusting tobacco. Exemplary alternatives have included devices wherein a solid or liquid fuel is combusted to transfer heat to tobacco or wherein a chemical reaction is used to provide such heat source. Examples include the smoking articles described in U.S. Pat. No. 9,078,473 to Worm et al., which is incorporated herein by reference in its entirety.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al.; and U.S. Pat. App. Pub. Nos. 2013/0255702 to Griffith, Jr. et al.; and 2014/0096781 to Sears et al., which are incorporated herein by reference in their entireties. See also, for example, the various types of smoking articles, aerosol delivery devices and electrically powered heat generating sources referenced by brand name and commercial source in U.S. Pat. App. Pub. No. 2015/0220232 to Bless et al., which is incorporated herein by reference in its entirety. Additional types of smoking articles, aerosol delivery devices and electrically powered heat generating sources referenced by brand name and commercial source are listed in U.S. Pat. App. Pub. No. 2015/0245659 to DePiano et al., which is also incorporated herein by reference in its entirety. Other representative cigarettes or smoking articles that have been described and, in some instances, been made commercially available include those described in U.S. Pat. No. 4,735,217 to Gerth et al.; U.S. Pat. Nos. 4,922,901, 4,947,874, and 4,947,875 to Brooks et al.; U.S. Pat. No. 5,060,671 to Counts et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; U.S. Pat. App. Pub. No. 2009/0095311 to Hon; U.S. Pat. App. Pub. Nos. 2006/0196518, 2009/

0126745, and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; and WO 2010/091593 to Hon, which are incorporated herein by reference in their entireties.

Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Fontem Ventures B. V.; COHITA™, COLIBRI™, ELITE CLASSIC™, MAGNUM™, PHANTOM™ and SENSE™ by EPUFFER® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™ JET™, MAXXQ™, PINK™ and PITBULL™ by SMOKE STIK®, HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd; IQOS™ by Philip Morris International; and GLO™ by British American Tobacco. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; and SOUTH BEACH SMOKE™.

Articles that produce the taste and sensation of smoking by electrically heating tobacco or tobacco derived materials have suffered from inconsistent performance characteristics. Accordingly, it is desirable to provide a smoking article that can provide the sensations of cigarette, cigar, or pipe smoking, without substantial combustion, and that does so with advantageous performance characteristics.

BRIEF SUMMARY

In various implementations, the present disclosure provides an aerosol source member and a method of manufacturing an aerosol source member. The present disclosure includes, without limitation, the following example implementations:

An aerosol source member for use with an aerosol delivery device, the aerosol source member comprising a substrate portion comprising at least one substrate material and at least one resonant receiver comprising at least one susceptor material, wherein at least a portion of the resonant receiver is configured to be positioned within a control body of the aerosol delivery device, the control body comprising at least one resonant transmitter, wherein the at least one susceptor material is configured to be inductively heated by the at least one resonant transmitter, and wherein the substrate portion is formed using additive manufacturing.

The aerosol source member of any preceding example implementation, or any combination of any preceding example implementations, wherein the at least one susceptor material comprises a carbonaceous material.

The aerosol source member of any preceding example implementation, or any combination of any preceding example implementations, wherein the carbonaceous material comprises a granular carbonaceous material.

The aerosol source member of any preceding example implementation, or any combination of any preceding example implementations, wherein the at least one susceptor material is mixed with the at least one substrate material in an even ratio.

The aerosol source member of any preceding example implementation, or any combination of any preceding example implementations, wherein the substrate portion comprises two or more substrate materials.

The aerosol source member of any preceding example implementation, or any combination of any preceding example implementations, wherein the substrate portion comprises two or more susceptor materials.

The aerosol source member of any preceding example implementation, or any combination of any preceding example implementations, wherein the substrate portion comprises two or more segments.

The aerosol source member of any preceding example implementation, or any combination of any preceding example implementations, wherein each segment includes a different aerosol precursor composition.

The aerosol source member of any preceding example implementation, or any combination of any preceding example implementations, further comprising a mouthend portion.

The aerosol source member of any preceding example implementation, or any combination of any preceding example implementations, wherein the mouthend portion includes a filter.

The aerosol source member of any preceding example implementation, or any combination of any preceding example implementations, wherein the at least one susceptor material and the at least one substrate material comprise layers in the substrate portion.

The aerosol source member of any preceding example implementation, or any combination of any preceding example implementations, wherein the at least one susceptor material layer and the at least one substrate material layer are formed in an alternating pattern.

A method of manufacturing an aerosol source member, the method comprising forming a substrate portion comprising at least one substrate material and at least one resonant receiver comprising at least one susceptor material using additive manufacturing.

The method of any preceding example implementation, or any combination of any preceding example implementations, wherein the at least one susceptor material comprises a carbonaceous material.

The method of any preceding example implementation, or any combination of any preceding example implementations, wherein the carbonaceous material comprises a granular carbonaceous material.

The method of any preceding example implementation, or any combination of any preceding example implementations, wherein the substrate portion is formed such that the at least one susceptor material is mixed with the at least one substrate material in an even ratio.

The method of any preceding example implementation, or any combination of any preceding example implementations, wherein the substrate portion comprises two or more substrate materials.

The method of any preceding example implementation, or any combination of any preceding example implementations, wherein the substrate portion comprises two or more susceptor materials.

The method of any preceding example implementation, or any combination of any preceding example implementations, wherein the step of forming a substrate portion comprises forming a substrate portion comprising two or more segments.

The method of any preceding example implementation, or any combination of any preceding example implementations, wherein each segment includes a different aerosol precursor composition.

The method of any preceding example implementation, or any combination of any preceding example implementations, wherein the at least one susceptor material and the at least one substrate material comprise layers in the substrate portion.

The method of any preceding example implementation, or any combination of any preceding example implementations, wherein the at least one susceptor material layer and the at least one substrate material layer are formed in an alternating pattern.

An aerosol delivery device, comprising a power source, a controller powered by the power source, a control body comprising a housing including an opening and at least one resonant transmitter controlled by the controller, and an aerosol source member comprising a substrate portion comprising at least one substrate material and at least one resonant receiver comprising at least one susceptor material, wherein at least a portion of the resonant receiver is configured to be positioned within the control body, wherein the at least one susceptor material is configured to be inductively heated by the at least one resonant transmitter, and wherein the substrate portion is formed using additive manufacturing.

The aerosol delivery device of any preceding example implementation, or any combination of any preceding example implementations, wherein the at least one susceptor material comprises a carbonaceous material.

The aerosol delivery device of any preceding example implementation, or any combination of any preceding example implementations, wherein the carbonaceous material comprises a granular carbonaceous material.

The aerosol delivery device of any preceding example implementation, or any combination of any preceding example implementations, wherein the at least one susceptor material is mixed with the at least one substrate material in an even ratio.

The aerosol delivery device of any preceding example implementation, or any combination of any preceding example implementations, wherein the substrate portion comprises two or more substrate materials.

The aerosol delivery device of any preceding example implementation, or any combination of any preceding example implementations, wherein the substrate portion comprises two or more susceptor materials.

The aerosol delivery device of any preceding example implementation, or any combination of any preceding example implementations, wherein the substrate portion comprises two or more segments.

The aerosol delivery device of any preceding example implementation, or any combination of any preceding example implementations, wherein each segment includes a different aerosol precursor composition.

The aerosol delivery device of any preceding example implementation, or any combination of any preceding example implementations, further comprising a mouthend portion.

The aerosol delivery device of any preceding example implementation, or any combination of any preceding example implementations, wherein the mouthend portion includes a filter.

The aerosol delivery device of any preceding example implementation, or any combination of any preceding example implementations, wherein the at least one susceptor material and the at least one substrate material comprise layers in the substrate portion.

The aerosol delivery device of any preceding example implementation, or any combination of any preceding example implementations, wherein the at least one susceptor material layer and the at least one substrate material layer are formed in an alternating pattern.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Figure 1:
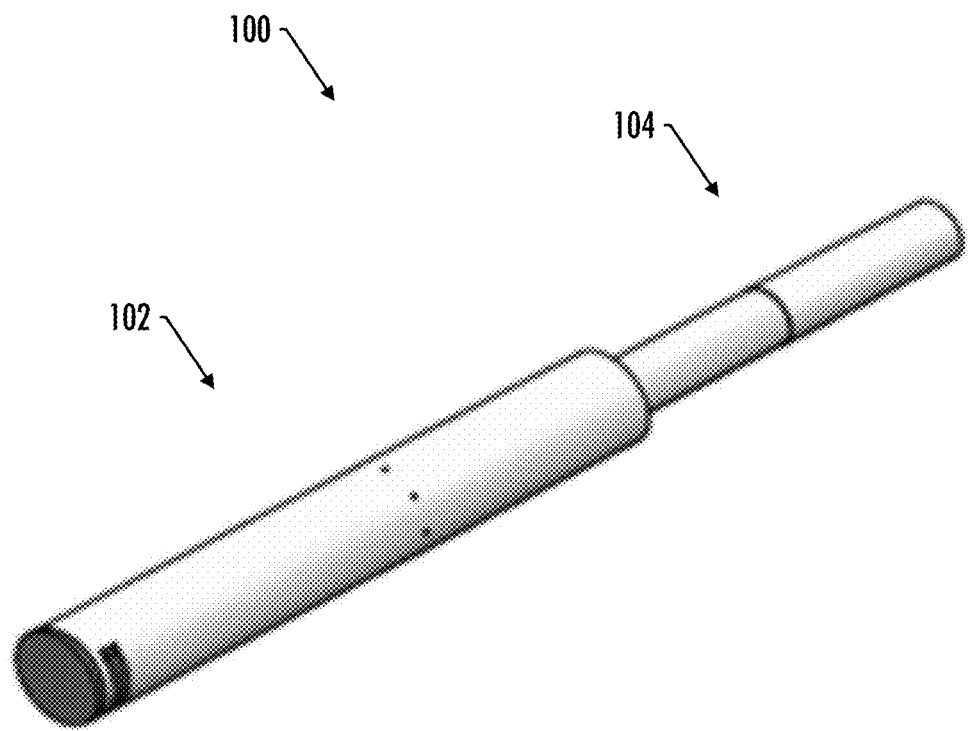
Figure 2:
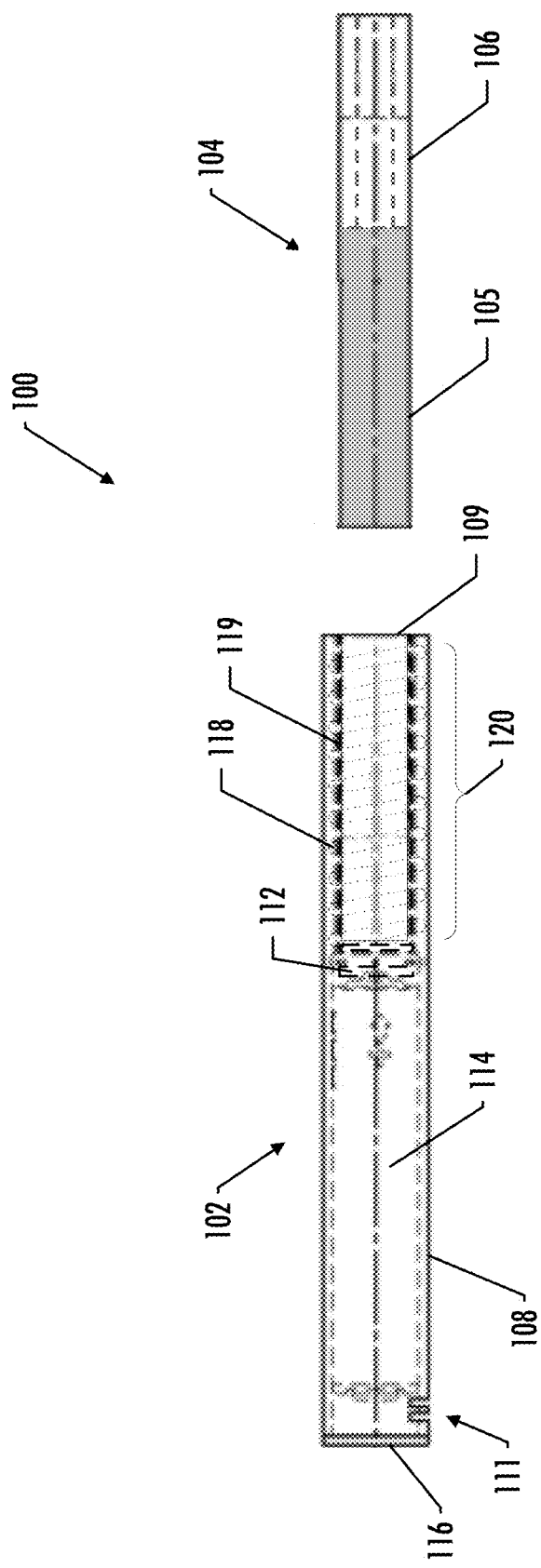
Figure 3:
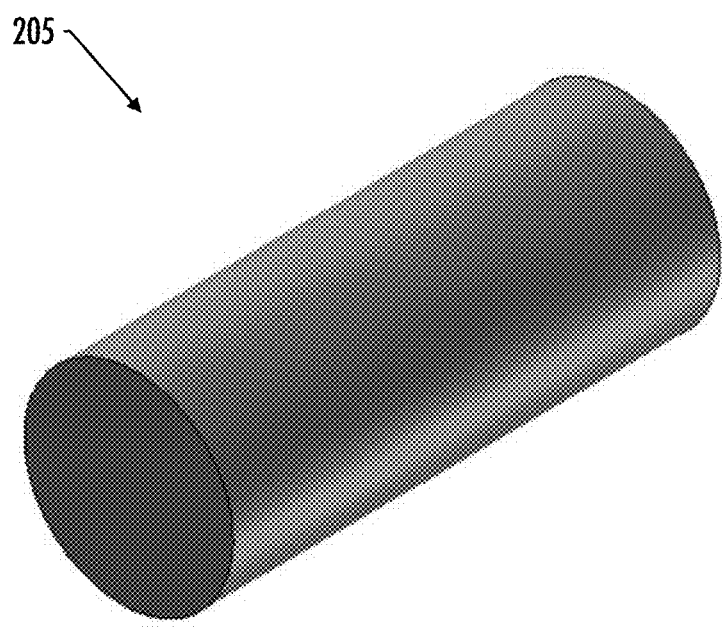
Figure 4:
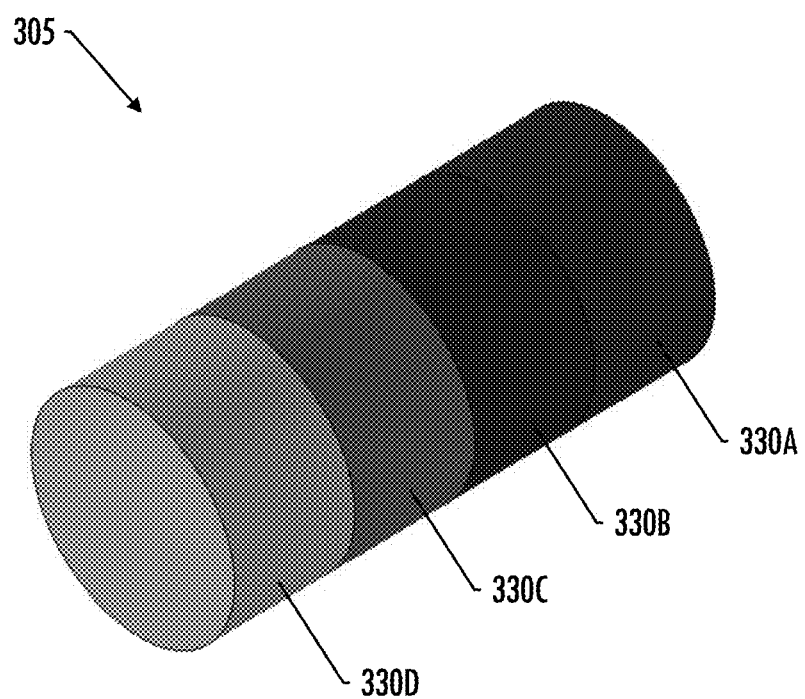
Figure 5:
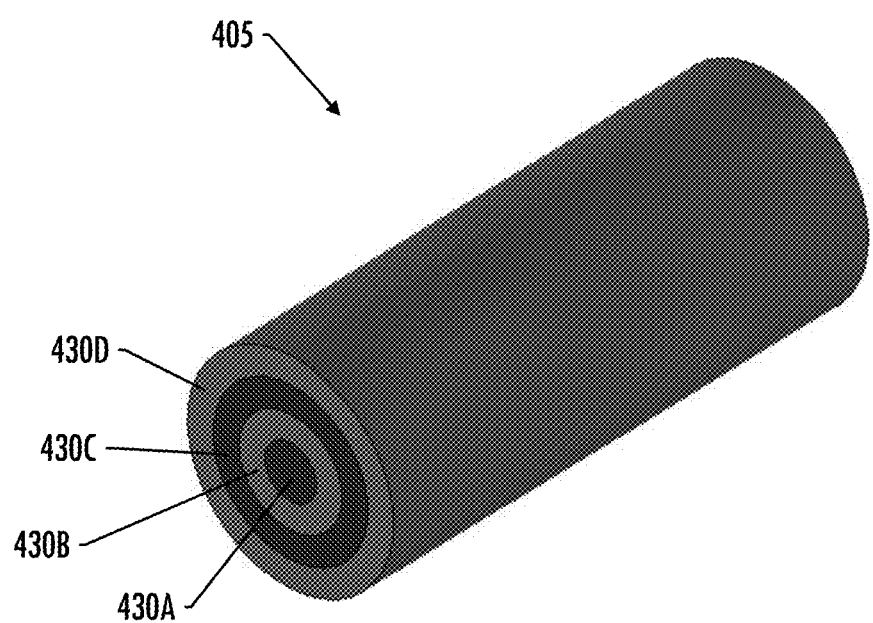
Figure 6:
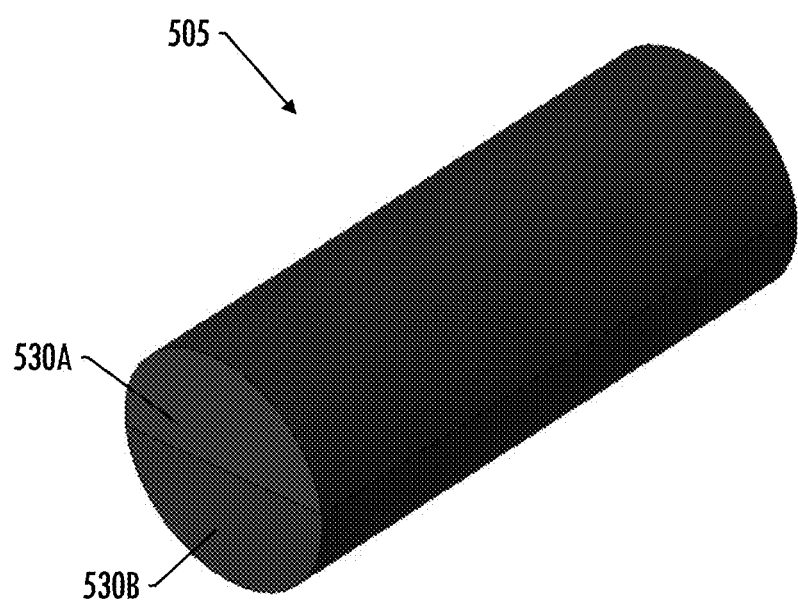
Figure 7:
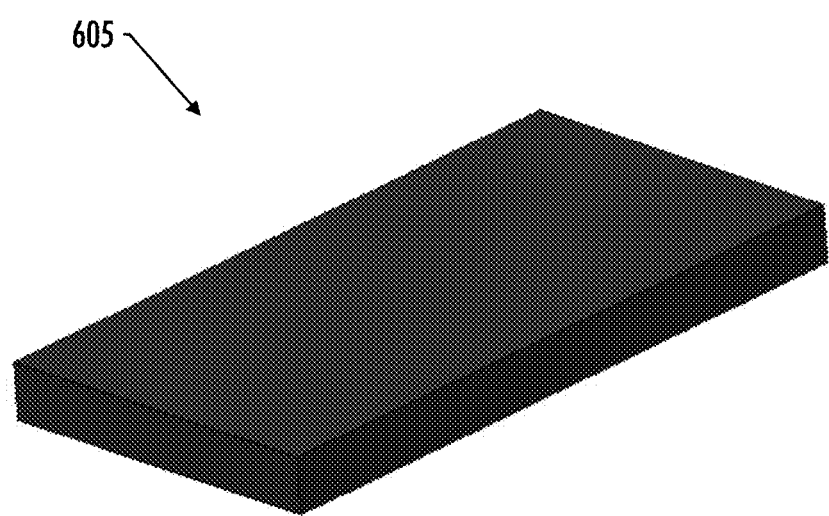
Figure 8:
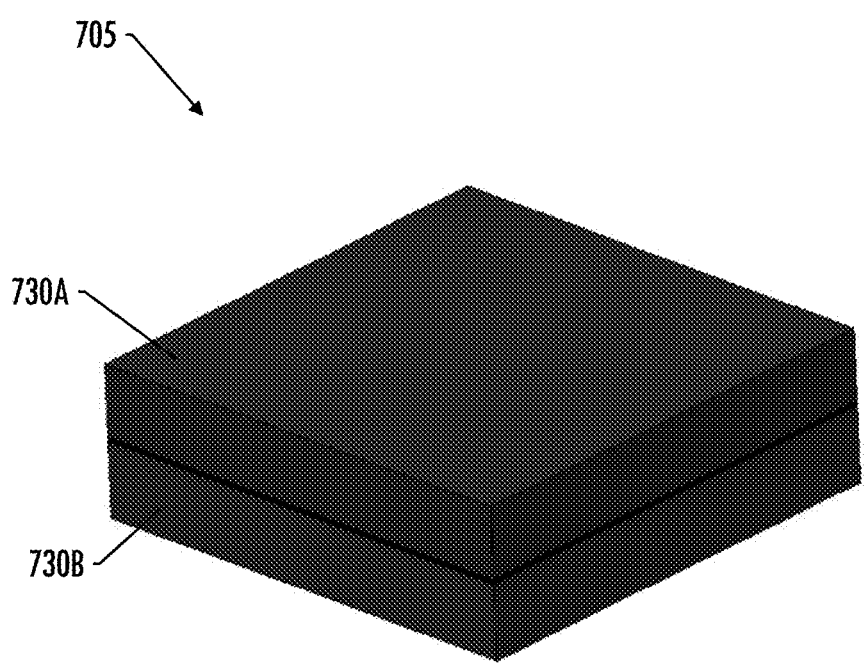

Having thus described the disclosure in the foregoing general terms, reference will now be made to the accompanying drawings, which are not necessarily drawn to scale, and wherein:

FIG. 1 illustrates a perspective view of an aerosol delivery device, according to an example implementation of the present disclosure;

FIG. 2 illustrates a front schematic view of an aerosol delivery device, according to an example implementation of the present disclosure;

FIG. 3 illustrates a perspective view of a substrate portion of an aerosol source member, according to an example implementation of the present disclosure;

FIG. 4 illustrates a perspective view of a substrate portion of an aerosol source member, according to an example implementation of the present disclosure;

FIG. 5 illustrates a perspective view of a substrate portion of an aerosol source member, according to an example implementation of the present disclosure;

FIG. 6 illustrates a front schematic view of a substrate portion of an aerosol source member, according to an example implementation of the present disclosure;

FIG. 7 illustrates a perspective view of a substrate portion of an aerosol source member, according to an example implementation of the present disclosure; and FIG. 8 illustrates a perspective view of a substrate portion of an aerosol source member, according to an example implementation of the present disclosure.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations and embodiments of the present disclosure relate to aerosol delivery devices. Aerosol delivery devices according to the present disclosure use electrical energy to heat a material (preferably without combusting the material to any significant degree) to form an inhalable substance. Thus, use of components of preferred aerosol delivery devices does not result in the production of smoke in the sense that aerosol results principally from by-products of combustion or pyrolysis of tobacco; but rather, use of those preferred systems results in the production of vapors resulting from volatilization or vaporization of certain components incorporated therein. In some example implementations, components of aerosol delivery devices may be characterized as electronic cigarettes, and those electronic cigarettes may incorporate tobacco and/or components derived from tobacco, and hence deliver tobacco-derived components in aerosol form.

Aerosol generating components of aerosol delivery devices of some example implementations may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol delivery device in accordance with some example implementations of the present disclosure can hold and use that component much like a smoker employs a traditional type of smoking article, draw on one end of that piece for inhalation of aerosol produced by that piece, take or draw puffs at selected intervals of time, and the like.

While the systems are generally described herein in terms of implementations associated with aerosol delivery devices such as so-called "e-cigarettes" or "tobacco heating products," it should be understood that the mechanisms, components, features, and methods may be embodied in many different forms and associated with a variety of articles. For example, the description provided herein may be employed in conjunction with implementations of traditional smoking articles (e.g., cigarettes, cigars, pipes, etc.), heat-not-burn cigarettes, and related packaging for any of the products disclosed herein. Accordingly, it should be understood that the description of the mechanisms, components, features, and methods disclosed herein are discussed in terms of implementations relating to aerosol delivery devices by way of example only, and may be embodied and used in various other products and methods.

Aerosol delivery devices of the present disclosure may also be characterized as being vapor-producing articles or medicament delivery articles. Thus, such articles or devices may be adapted so as to provide one or more substances (e.g., flavors and/or pharmaceutical or nutraceutical active ingredients) in an inhalable form or state. For example, inhalable substances may be substantially in the form of a vapor (i.e., a substance that is in the gas phase at a temperature lower than its critical point). Alternatively, inhalable substances may be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like. The physical form of the inhalable substance is not necessarily limited by the nature of the inventive devices but rather may depend upon the nature of the medium and the inhalable substance itself as to whether it exists in a vapor state or an aerosol state. In some implementations, the terms "vapor" and "aerosol" may be interchangeable. Thus, for simplicity, the terms "vapor" and "aerosol" as used to describe aspects of the disclosure are understood to be interchangeable unless stated otherwise.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. In some example implementations, an elongated body resembling the shape of a cigarette or cigar can be formed from a single, unitary housing or the elongated housing can be formed of two or more separable bodies. For example, an aerosol delivery device may comprise an elongated shell or body that can be substantially tubular in shape and, as such, resemble the shape of a conventional cigarette or cigar. In another example, an aerosol delivery device may be substantially rectangular or have a substantially rectangular cuboid shape. In one example, all of the components of the aerosol delivery device are contained within one housing. Alternatively, an aerosol delivery device may comprise two or more housings that are joined and are separable. For example, an aerosol delivery device can possess at one end a control body comprising a housing containing one or more reusable components (e.g., an accumulator such as a rechargeable battery and/or rechargeable supercapacitor, and various electronics for controlling the operation of that article), and at the other end and removably coupleable thereto, another reusable component (e.g., a mouthpiece) or a disposable component (e.g., a disposable flavor-containing cartridge containing aerosol precursor material, flavorant, etc.). More specific formats, configurations and arrangements of components within the single housing type of unit or within a multi-piece separable housing type of unit will be evident in light of the further disclosure provided herein. Additionally, various aerosol delivery device designs and component arrangements can be appreciated upon consideration of the commercially available electronic aerosol delivery devices.

As will be discussed in more detail below, aerosol delivery devices of the present disclosure may include some combination of a power source (e.g., an electrical power source), at least one control component (e.g., means for actuating, controlling, regulating and ceasing power for heat generation, such as by controlling electrical current flow from the power source to other components of the article—e.g., a microprocessor, individually or as part of a microcontroller), and a heater or heat generation member (e.g., an inductive heating arrangement). Such aerosol delivery devices may be configured to accept one or more aerosol source members that include a substrate portion capable of yielding an aerosol upon application of sufficient heat. In some implementations, the aerosol delivery device may include a mouthpiece portion configured to allow drawing upon the aerosol delivery device for aerosol inhalation (e.g., a defined airflow path through the article such that aerosol generated can be withdrawn therefrom upon draw). In some implementations, the mouthpiece portion may be a separate component, while in other implementations the control body or the aerosol source member may include the mouthpiece portion.

Alignment of the components within the aerosol delivery device of the present disclosure can vary. In specific implementations, the substrate portion may be positioned proximate a heating member (or a component of a heating arrangement) so as to maximize aerosol delivery to the user. Other configurations, however, are not excluded. Generally, the heating member (or a component of the heating arrangement) may be positioned sufficiently near the substrate portion so that heat can volatilize the substrate material (as well as, in some implementations, one or more flavorants, medicaments, or the like that may likewise be provided for delivery to a user) and form an aerosol for delivery to the user. When the substrate material is heated, an aerosol is formed, released, or generated in a physical form suitable for inhalation by a user. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof, wherein such terms are also interchangeably used herein except where otherwise specified.

As noted above, the aerosol delivery device of various implementations may incorporate a power source (e.g., a battery or other electrical power source) to provide current flow sufficient to provide various functionalities to the aerosol delivery device, such as powering of a heating member, powering of an induction coil, powering of control systems, powering of indicators, and the like. The power source can take on various implementations. In some implementations, the power source is able to deliver sufficient power to rapidly activate the heating source to provide for aerosol formation and power the aerosol delivery device through use for a desired duration of time. The power source may be sized to fit conveniently within the aerosol delivery device so that the aerosol delivery device can be easily handled. Additionally, in some implementations, a power source may be of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices. Further, the arrangement of the components within the aerosol delivery device can also be appreciated upon consideration of the commercially available electronic aerosol delivery devices.

In the depicted implementations, an inductive heating arrangement (heater or heat generating member) is used. In various implementations, the inductive heating arrangement may comprise at least one resonant transmitter and at least one resonant receiver (e.g., one or more susceptor materials). In such a manner, operation of the aerosol delivery device may require directing alternating current to the resonant transmitter to produce an oscillating magnetic field in order to induce eddy currents in the resonant receiver. In various implementations, the resonant receiver may be part of an aerosol source member (e.g., mixed with the substrate material and/or disposed proximate to the at least one substrate material of a substrate portion).

This alternating current causes the resonant receiver to generate heat and thereby creates an aerosol from the substrate material. Examples of various inductive heating methods and configurations are described in U.S. Pat. App. Pub. No. 2019/0124979 to Sebastian et al., which is incorporated by reference herein in its entirety. Further examples of various induction-based control components and associated circuits are described in U.S. Pat. App. Pub. No. 2018/0132531, and U.S. Patent App. Pub. No. 2017/0202266 to Sur et al., each of which is incorporated herein by reference in its entirety. It should be noted that although the depicted implementations describe a single resonant transmitter, in other implementations, there may be multiple independent resonant transmitters.

As noted, in some implementations a change in current in the resonant transmitter (e.g., an induction coil), as directed thereto from the power source by the control component (e.g., via a driver circuit) may produce an alternating electromagnetic field that penetrates a susceptor material, thereby generating electrical eddy currents within the susceptor material. In some implementations, the alternating electromagnetic field may be produced by directing alternating current to the resonant transmitter. In some implementations, the control component may include an inverter or inverter circuit configured to transform direct current provided by the power source to alternating current that is provided to the resonant transmitter. As such, in some implementations a resonant transmitter and a substrate portion may be positioned proximate each other to heat the substrate portion or a portion thereof (e.g., the substrate material of the substrate portion) by inductive heating. As will be described in more detail below, a portion of the inductive heating arrangement may be positioned in the control body and a portion of the inductive heating arrangement may be positioned in the substrate portion.

The eddy currents flowing in the susceptor material may generate heat through the Joule effect, wherein the amount of heat produced is proportional to the square of the electrical current times the electrical resistance of the susceptor material. For implementations wherein the susceptor material comprises ferromagnetic materials, heat may also be generated by magnetic hysteresis losses. Several factors may contribute to the temperature rise of the susceptor material including, but not limited to, proximity to the resonant transmitter, distribution of the magnetic field, electrical resistivity of the material of the susceptor component, saturation flux density, skin effects or depth, hysteresis losses, magnetic susceptibility, magnetic permeability, and dipole moment of the material.

FIG. 1 illustrates a perspective view an aerosol delivery device 100, according to an example implementation of the present disclosure. In the depicted implementation, the aerosol delivery device 100 includes a control body 102 and an aerosol source member 104. In various implementations, the aerosol source member 104 and the control body 102 can be permanently or detachably aligned in a functioning relationship. In this regard, FIG. 1 illustrates the aerosol delivery device 100 with a removable aerosol source member 104 coupled with the control body 102. Various mechanisms may connect the aerosol source member 104 to the control body 102 to result in a threaded engagement, a press-fit engagement, an interference fit, a sliding fit, a magnetic engagement, or the like. In various implementations, the control body 102 and/or the aerosol source member 104 of the aerosol delivery device 100 may be substantially rod-like, substantially tubular shaped, substantially rectangular or rectangular cuboidal shaped, or substantially cylindrically shaped. In other implementations, the control body may take another hand-held shape, such as a small box shape, various pod mod (e.g., all-in-one) shapes, or a fob-shape.

In specific implementations, one or both of the control body and aerosol source member may be referred to as being disposable or as being reusable. As will be described in more detail below, the aerosol source member of the present disclosure includes a substrate portion, which in some implementations may comprise all of the aerosol source member, or in other implementations may comprise a portion of the aerosol source member. In some implementations, the aerosol source members may be referred to as being disposable. In some implementations, the entire device may be characterized as being disposable in that the control body may be configured for only a limited number of uses (e.g., until a battery power component no longer provides sufficient power to the article) with a limited number of aerosol source members and, thereafter, the entire device, including the control body, may be discarded. In other implementations, the control body may have a replaceable battery such that the control body may be reused through a number of battery exchanges and with many aerosol source members. Similarly, the device may be rechargeable and thus may be combined with any type of recharging technology.

For example, the control body may have a replaceable battery or a rechargeable battery, solid-state battery, thin-film solid-state battery, rechargeable supercapacitor or the like, and thus may be combined with any type of recharging technology, including connection to a wall charger, connection to a car charger (i.e., cigarette lighter receptacle), and connection to a computer, such as through a universal serial bus (USB) cable or connector (e.g., USB 2.0, 3.0, 3.1, USB Type-C), connection to a photovoltaic cell (sometimes referred to as a solar cell) or solar panel of solar cells, a wireless charger, such as a charger that uses inductive wireless charging (including for example, wireless charging according to the Qi wireless charging standard from the Wireless Power Consortium (WPC)), or a wireless radio frequency (RF) based charger. An example of an inductive wireless charging system is described in U.S. Pat. App. Pub. No. 2017/0112196 to Sur et al., which is incorporated herein by reference in its entirety. Further, in some implementations, the mouthpiece portion may comprise a single-use device. A single use component for use with a control body is disclosed in U.S. Pat. No. 8,910,639 to Chang et al., which is incorporated herein by reference in its entirety. In some implementations, the control body may be inserted into and/or coupled with a separate charging station for charging a rechargeable battery of the device. In some implementations, the charging station itself may include a rechargeable power source that recharges the rechargeable battery of the device.

FIG. 2 illustrates a front schematic view of an aerosol delivery device, according to an example implementation of the present disclosure. In particular, FIG. 2 illustrates the aerosol delivery device 100 of FIG. 1. In the depicted implementation, the aerosol source member 104 is attachable and removable from the control body 102 and includes a substrate portion 105 and a mouthend portion 106, which may, in some implementations, include a filter (e.g., made of cellulose, cellulose acetate, cellulose acetate tow, paper, cotton, polypropylene web, polypropylene tow, polyester web, polyester tow or a combination thereof). In some implementations, the filter may provide filtering capacity, if desired, and/or provide resistance to draw. In the depicted implementation, the substrate portion 105 is integral with a mouthend portion 106. In other implementations, however, the substrate portion may be separate from the mouthend portion. In still other implementations, the substrate portion may comprise the entire aerosol source member. For implementation that include a filter, the filter of some implementations may comprise discrete segments. For example, some implementations may include a segment providing filtering, a segment providing draw resistance, a hollow segment providing a space for the aerosol to cool, a segment providing increased structural integrity, other filter segments, or any one or any combination of the above. Some implementations need not include a filter. In various implementations other components may exist in the mouthpiece portion. For example, in some implementations one or any combination of the following may be included in the mouthpiece portion: an air gap; phase change materials for cooling air; flavor releasing media; ion exchange fibers capable of selective chemical adsorption; aerogel particles as filter medium; and other suitable materials.

As noted above, various implementations of the present disclosure employ an inductive heating arrangement to heat the substrate portion of an aerosol source member received in the device. The inductive heating arrangement may comprise at least one resonant transmitter and at least one resonant receiver (hereinafter also referred to as a susceptor and/or susceptor material). In various implementations, one or both of the resonant transmitter and a resonant receiver may be located in the control body and/or the aerosol source member. Some implementations may include multiple resonant receivers, including for example, a resonant receiver located in the aerosol source member and a resonant receiver located in the control body. As will be described in more detail below, in various implementations of the present disclosure the substrate portion comprises an aerosol generating material and a susceptor material. Examples of additional possible components are described in U.S. Pat. App. Pub. No. 2019/0124979 to Sebastian et al., which is incorporated herein by reference in its entirety.

Referring back to FIG. 2, the control body 102 of the depicted implementation may comprise a housing 108 that includes an opening 109 defined on one end thereof, a flow sensor 111 (e.g., a puff sensor or pressure switch), a control component 112 (e.g., a microprocessor, individually or as part of a microcontroller, a printed circuit board (PCB) that includes a microprocessor and/or microcontroller, etc.), a power source 114 (e.g., a battery, which may be rechargeable, and/or a rechargeable supercapacitor), and an end cap that, in some implementations, may include an indicator 116 (e.g., a light emitting diode (LED)).

Some examples of possible power sources are described in U.S. Pat. No. 9,484,155 to Peckerar et al., and U.S. Pat. App. Pub. No. 2017/0112191 to Sur et al., filed Oct. 21, 2015, the disclosures of which are incorporated herein by reference in their respective entireties. With respect to the flow sensor 111, some representative current regulating components and other current controlling components including various microcontrollers, sensors, and switches for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. Pat. No. 9,423,152 to Ampolini et al., which is incorporated herein by reference in its entirety. In one implementation, the indicator 116 may comprise one or more light emitting diodes, quantum dot-based light emitting diodes or the like. The indicator 116 can be in communication with the control component 112 and be illuminated, for example, when a user draws on the aerosol source member 104, when coupled to the control body 102, as detected by the flow sensor 120.

In some implementations, an input element may be included with the aerosol delivery device (and may replace or supplement an airflow or pressure sensor). The input may be included to allow a user to control functions of the device and/or for output of information to a user. Any component or combination of components may be utilized as an input for controlling the function of the device. For example, one or more pushbuttons may be used as described in U.S. Pub. No. 2015/0245658 to Worm et al., which is incorporated herein by reference in its entirety. Likewise, a touchscreen may be used as described in U.S. Pat. App. Pub. No. 2016/0262454, to Sears et al., which is incorporated herein by reference in its entirety. As a further example, components adapted for gesture recognition based on specified movements of the aerosol delivery device may be used as an input. See U.S. Pat. App. Pub. No. 2016/0158782 to Henry et al., which is incorporated herein by reference in its entirety. As still a further example, a capacitive sensor may be implemented on the aerosol delivery device to enable a user to provide input, such as by touching a surface of the device on which the capacitive sensor is implemented.

Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating of a heating device; U.S. Pat. No. 5,372,148 to McCafferty et al.

discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and PCT Pat. App. Pub. No. WO 2010/003480 by Flick discloses a fluid flow sensing system indicative of a puff in an aerosol generating system; all of the foregoing disclosures being incorporated herein by reference in their entireties.

Other suitable current actuation/deactuation mechanisms may include a temperature actuated on/off switch or a lip pressure actuated switch, or a touch sensor (e.g., capacitive touch sensor) configured to sense contact between a user (e.g., mouth or fingers of user) and one or more surfaces of the aerosol delivery device. An example mechanism that can provide such puff-actuation capability includes a Model 163PC01D36 silicon sensor, manufactured by the MicroSwitch division of Honeywell, Inc., Freeport, Ill. With such sensor, the heating member may be activated rapidly by a change in pressure when the user draws on the device. In addition, flow sensing devices, such as those using hot-wire anemometry principles, may be used to cause the energizing of the heating assembly sufficiently rapidly after sensing a change in airflow. A further puff actuated switch that may be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing means. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. In some implementations, a pressure-sensing tube or other passage providing fluid connection between the puff actuated switch and aerosol source member may be included in the housing so that pressure changes during draw are readily identified by the switch. Other example puff actuation devices that may be useful according to the present disclosure are disclosed in U.S. Pat. Nos. 4,922,901, 4,947,874, and 4,947,874, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties.

Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. No. 9,220,302 to DePiano et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; PCT Pat. App. Pub. No. WO 2010/091593 to Hon; and PCT Pat. App. Pub. No. WO 2013/089551 to Foo, each of which is incorporated herein by reference in its entirety. Further, U.S. Pat. App. Pub. No. 2017/0099877, discloses capsules that may be included in aerosol delivery devices and fob-shape configurations for aerosol delivery devices, and is incorporated herein by reference in its entirety. A variety of the materials disclosed by the foregoing documents may be incorporated into the present devices in various implementations, and all of the foregoing disclosures are incorporated herein by reference in their entireties.

As noted above, the aerosol delivery device 100 of the depicted implementation comprises an inductive heating arrangement. In the implementation depicted in FIG. 2, the control body 102 includes a resonant transmitter 118, and the substrate portion 105 of the aerosol source member 104 includes at least one resonant receiver having at least one susceptor material, which together facilitate heating of at least a portion of the substrate portion. Although in various implementations the aerosol source member and/or the substrate portion may have a variety of forms, in the depicted implementation the substrate portion 105 comprises a combination of a substrate material and a susceptor material. Although in various implementations the resonant transmitter may have a variety of forms, in the depicted implementation the resonant transmitter comprises an induction coil 118 (such as, but not limited to, a helical coil) that surrounds a support cylinder 119, although in other implementations there need not be a support cylinder. In various implementations, the resonant transmitter may be made of one or more conductive materials, including, for example, silver, gold, aluminum, brass, zinc, iron, nickel, and alloys of thereof, conductive ceramics e.g., yttrium-doped zirconia, indium tin oxide, yttrium doped titanate, etc, and any combination of the above. In the illustrated implementation, the induction coil 118 is made of a conductive metal material, such as copper. In further implementations, the induction coil may include a non-conductive insulating cover/wrap material. Such materials may include, for example, one or more polymeric materials, such as epoxy, silicon rubber, etc., which may be helpful for low temperature applications, or fiberglass, ceramics, refractory materials, etc., which may be helpful for high temperature applications.

In the depicted implementation of FIG. 2, the control body 102 of the aerosol delivery device 100 defines a receiving compartment 120, which is configured to receive at least a portion of the substrate portion 105 of the aerosol source member 104 and is defined proximate to the opening 109 of the control body 102. In some implementations, such as the depicted implementation, the receiving compartment may comprise a receiving chamber configured to receive the substrate portion 105 of the aerosol source member 104. In other implementations, however, the receiving compartment may have other forms. For example, in some implementations, the receiving compartment may comprise a rotatable door, a siding tray, etc. As will be discussed in more detail below, the substrate portion of various implementations may have different shapes. As such, the shape of the receiving compartment of various implementations may be configured to accommodate one or more different shapes of a substrate portion. For example, in some implementations in which the substrate portion has a substantially round cross-section, the receiving compartment may have a substantially cylindrical shape, etc. The housing 108 may include one or more apertures therein for allowing entrance of ambient air to be directed into the device such as, for example, through the substrate portion and/or other portion of the aerosol source member so that when a user draws on the aerosol source member, air may be drawn into the receiving compartment and through the substrate portion for inhalation by the user.

In the depicted implementation, the resonant transmitter 118 extends proximate to an engagement end of the housing 108, and may be configured to substantially surround at least a portion of the receiving compartment 120. In the depicted implementation, the induction coil 118 defines a generally tubular configuration. In some implementations, a support cylinder 119 may also define a tubular configuration and may be configured to support the induction coil 118 such that the induction coil 118 does not contact with the aerosol source member. As such, the support cylinder 119 may comprise a nonconductive material, which may be substantially transparent to an oscillating magnetic field produced by the induction coil 118. In various implementations, the induction coil 118 may be imbedded in, or otherwise coupled to, the support cylinder 119. In the illustrated implementation, the induction coil 118 is engaged with an outer surface of the support cylinder 119; however, in other implementations, the coil may be positioned at an inner surface of the support cylinder, be fully imbedded in the support cylinder, or have some other configuration.

As noted above, in various implementations of the present disclosure the substrate portion of the aerosol source member includes a combination of a substrate material and a susceptor material. In various implementations, the substrate portion is configured to be formed via an additive manufacturing process. In general, additive manufacturing involves using computer-aided-design (CAD) software or other modeling or imaging software to create a model of an object and to direct an additive manufacturing device to construct the object by depositing successive layers of material one on top of another. One example of additive manufacturing is 3D printing. In one implementation of the present disclosure, a substrate portion may be formed by mixing the substrate material and the susceptor material together and then forming the substrate portion with the mixed material. In some of such implementations, the susceptor material may be substantially evenly distributed within the substrate portion. For example, in some implementations, the substrate material may comprise a granular material (including, but not limited to, shreds, grains, beads, particles etc.) and the susceptor material may comprise a granular material (including, but not limited to, shreds, grains, beads, particles etc.). In such a manner, the granular substrate material and the granular susceptor material may be mixed together (with or without additional additives) and then used by an additive manufacturing device to form a substrate portion having a predefined shape. For example, in some implementations the substrate material and the susceptor material may be mixed in a substantially even ratio, with or without additional materials. In other implementations, the substrate material and the susceptor material may not be mixed together prior to forming a substrate portion, and the substrate material and the susceptor material may be formed by respective layers, which in some implementation may be formed in an alternating pattern or manner.

FIG. 3 shows a non-limiting example of a substrate portion 205, according one example implementation of the present disclosure. In various implementations, a substrate portion of the present disclosure may have a variety of different shapes, including, but not limited to, a cuboidal shape having a square cross-section, a cuboidal shape having a rectangular cross-section, a cylinder shape having a circular cross-section, as well as other shapes having other cross-sections, including, but not limited to shapes having an oval cross-section, a triangular cross-section, a pentagon cross-section, an octagon cross-section, a star cross-section, a diamond cross-section, etc. In the implementation depicted in FIG. 3, the substrate portion 205 has a substantially cylindrical shape having a circular cross-section. In the depicted implementation, the substrate portion 205 is formed from a mixture of substrate material and susceptor material via additive manufacturing (such as, for example, via 3D printing). Although not shown in the figures, a substrate portion of some implementations may include one or more passages configured to allow air and/or aerosol flow therethrough. In some implementations, the passages may extend from one end surface to the other end surface through the substrate portion.

In various implementations, the substrate material may comprise a tobacco material, a non-tobacco material, or a combination thereof. In some implementations, the substrate material may include, or may essentially be comprised of one or more of a tobacco, a tobacco related material, glycerin, water, a binder material, a diluent, and/or fillers and firming agents, such as, for example, calcium carbonate, rice flour, corn flour, etc. In various implementations, suitable binder materials may include alginates, such as ammonium alginate, propylene glycol alginate, potassium alginate, and sodium alginate. Alginates, and particularly high viscosity alginates, may be employed in conjunction with controlled levels of free calcium ions. Other suitable binder materials include hydroxypropylcellulose such as Klucel H from Aqualon Co.; hydroxypropylmethylcellulose such as Methocel K4MS from The Dow Chemical Co.; hydroxyethylcellulose such as Natrosol 250 MRCS from Aqualon Co.; microcrystalline cellulose such as Avicel from FMC; methylcellulose such as Methocel A4M from The Dow Chemical Co.; and sodium carboxymethyl cellulose such as CMC 7HF and CMC 7H4F from Hercules Inc. Still other possible binder materials include starches (e.g., corn starch), guar gum, carrageenan, locust bean gum, pectins and xanthan gum. In some implementations, combinations or blends of two or more binder materials may be employed. Other examples of binder materials are described, for example, in U.S. Pat. No. 5,101,839 to Jakob et al.; and U.S. Pat. No. 4,924,887 to Raker et al., each of which is incorporated herein by reference in its entirety. In some implementations, an aerosol forming material may be provided as a portion of the binder material (e.g., propylene glycol alginate). In addition, in some implementations the binder material may comprise nanocellulose derived from a tobacco or other biomass. Some implementations may include diluents, which may include, for example, starches or partially pregelatinized starches, highly functional polyols, soluble diluents including maltodextrins, dried glucose syrups, dextrose monohydrate, and dextrose anhydrous, and microcrystalline cellulose (MCC). Other examples include lactose, spray dried lactose, Pvpk30 (Pearlitol SD200 and 25C), sorbitol, dibasic calcium phosphate dehydrate, calcium sulphate dehydrate, etc.

In some implementations, the substrate material may, at some point in the process (e.g., prior to granulation), comprise an extruded material. An example of an extruded substrate material is described in U.S. Pat. App. Pub. No. 2012/0042885 to Stone et al., which is incorporated herein by reference in its entirety. In yet another implementation, the substrate material may begin as an extruded structure and/or substrate formed from marumarized and/or non-marumarized tobacco. Marumarized tobacco is known, for example, from U.S. Pat. No. 5,105,831 to Banerjee, et al., which is incorporated by reference herein in its entirety. Marumarized tobacco includes about 20 to about 50 percent (by weight) tobacco blend in powder form, with glycerol (at about 20 to about 30 percent weight), calcium carbonate (generally at about 10 to about 60 percent by weight, often at about 40 to about 60 percent by weight), along with binder agents, as described herein, and/or flavoring agents. In various implementations, the extruded material may have one or more longitudinal openings. In other implementations, the extruded material may have two or more sectors, such as, for example, an extrudate with a wagon wheel-like cross section.

Additionally or alternatively, the substrate material may, at some point in the process, comprise an extruded structure and/or a substrate that includes or essentially is comprised of tobacco, glycerin, water, and/or binder material. Some example tobacco and/or tobacco related materials that may be suitable are described in U.S. Pat. App. Pub. No. 2015/0157052 to Ademe et al.; U.S. Pat. App. Pub. No. 2015/0335070 to Sears et al.; U.S. Pat. No. 6,204,287 to White; and U.S. Pat. No. 5,060,676 to Hearn et al., which are incorporated herein by reference in their entirety.

In other implementations, the substrate material may comprise a blend of flavorful and aromatic tobaccos in cut filler form. In another implementation, the substrate material may comprise a reconstituted tobacco material, such as described in U.S. Pat. No. 4,807,809 to Pryor et al.; U.S. Pat. No. 4,889,143 to Pryor et al. and U.S. Pat. No. 5,025,814 to Raker, the disclosures of which are incorporated herein by reference in their entireties. Additionally, a reconstituted tobacco material may include a reconstituted tobacco paper for the type of cigarettes described in Chemical and Biological Studies on New Cigarette Prototypes that Heat Instead of Burn Tobacco, R. J. Reynolds Tobacco Company Monograph (1988), the contents of which are incorporated herein by reference in their entirety. For example, a reconstituted tobacco material may include a sheet-like material containing tobacco and/or tobacco-related materials. As such, in some implementations, the substrate material may first be formed from a wound roll of a reconstituted tobacco material. In another implementation, the substrate material may be formed from shreds, strips, and/or the like of a reconstituted tobacco material. In another implementation, the substrate material may first be formed into a tobacco sheet that may comprise a crimped sheet of reconstituted tobacco material. In some implementations, the substrate material may first be formed into overlapping layers (e.g., a gathered web), which may, or may not, include heat conducting constituents. Other examples include a series of overlapping layers (e.g., gathered webs) of an initial substrate sheet formed by the fibrous filler material, aerosol forming material, and plurality of heat conducting constituents are described in U.S. Pat. App. Pub. No. 2019/0261685 to Sebastian, et al., which is incorporated herein by reference in its entirety.

In some implementations, the substrate material may comprise a plurality of microcapsules, beads, granules, and/or the like having a tobacco-related material. For example, a representative microcapsule may be generally spherical in shape, and may have an outer cover or shell that contains a liquid center region of a tobacco-derived extract and/or the like. In some implementations, the substrate material may include a plurality of microcapsules each formed into a hollow cylindrical shape. In some implementations, the substrate material may include a binder material configured to maintain the structural shape and/or integrity of the plurality of microcapsules formed into the hollow cylindrical shape.

Tobacco employed in one or more of the substrate materials may include, or may be derived from, tobaccos such as flue-cured tobacco, burley tobacco, Oriental tobacco, Maryland tobacco, dark tobacco, dark-fired tobacco and Rustica tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al.; U.S. Pat. No. 7,011,096 to Li et al.; U.S. Pat. No. 7,017,585 to Li et al.; U.S. Pat. No. 7,025,066 to Lawson et al.; U.S. Pat. App. Pub. No. 2004/0255965 to Perfetti et al.; PCT Pub. No. WO 02/37990 to Bereman; and Bombick et al., *Fund. Appl. Toxicol.*, 39, p. 11-17 (1997); the disclosures of which are incorporated herein by reference in their entireties.

In various implementations, the substrate material may take on a variety of conformations based upon the various amounts of materials utilized therein. For example, a sample substrate material may comprise up to approximately 98% by weight, up to approximately 95% by weight, or up to approximately 90% by weight of a tobacco and/or tobacco related material. A sample substrate material may also comprise up to approximately 25% by weight, approximately 20% by weight, or approximately 15% by weight water—particularly approximately 2% to approximately 25%, approximately 5% to approximately 20%, or approximately 7% to approximately 15% by weight water. Flavors and the like (which include, for example, medicaments, such as nicotine) may comprise up to approximately 10%, up to about 8%, or up to about 5% by weight of the aerosol delivery component.

In some implementations, flame/burn retardant materials and other additives may be included within the substrate material and may include organo-phosphorus compounds, borax, hydrated alumina, graphite, potassium tripolyphosphate, dipentaerythritol, pentaerythritol, and polyols. Others such as nitrogenous phosphonic acid salts, mono-ammonium phosphate, ammonium polyphosphate, ammonium bromide, ammonium borate, ethanolammonium borate, ammonium sulphamate, halogenated organic compounds, thiourea, and antimony oxides are suitable but are not preferred agents. In each aspect of flame-retardant, burn-retardant, and/or scorch-retardant materials used in the substrate material and/or other components (whether alone or in combination with each other and/or other materials), the desirable properties most preferably are provided without undesirable off-gassing or melting-type behavior. Other examples include diammonium phosphate and/or another salt configured to help prevent ignition, pyrolysis, combustion, and/or scorching of the substrate material by the heat source. Various manners and methods for incorporating tobacco into smoking articles, and particularly smoking articles that are designed so as to not purposefully burn virtually all of the tobacco within those smoking articles are set forth in U.S. Pat. No. 4,947,874 to Brooks et al.; U.S. Pat. No. 7,647,932 to Cantrell et al.; U.S. Pat. No. 8,079,371 to Robinson et al.; U.S. Pat. No. 7,290,549 to Banerjee et al.; and U.S. Pat. App. Pub. No. 2007/0215167 to Crooks et al.; the disclosures of which are incorporated herein by reference in their entireties.

According to other implementations of the present disclosure, the substrate material may also incorporate tobacco additives of the type that are traditionally used for the manufacture of tobacco products. Those additives may include the types of materials used to enhance the flavor and aroma of tobaccos used for the production of cigars, cigarettes, pipes, and the like. For example, those additives may include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Example casing materials may include water, sugars and syrups (e.g., sucrose, glucose and high fructose corn syrup), humectants (e.g. glycerin or propylene glycol), and flavoring agents (e.g., cocoa and licorice). Those added components may also include top dressing materials (e.g., flavoring materials, such as menthol). See, for example, U.S. Pat. No. 4,449,541 to Mays et al., the disclosure of which is incorporated herein by reference in its entirety. Further materials that may be added include those disclosed in U.S. Pat. No. 4,830,028 to Lawson et al. and U.S. Pat. No. 8,186,360 to Marshall et al., the disclosures of which are incorporated herein by reference in their entireties.

In various implementations, one or more of the substrate materials may have an aerosol precursor composition associated therewith. For example, in some implementations the aerosol precursor composition may comprise one or more different components, such as polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference their entireties. In some aspects, a substrate material may produce a visible aerosol upon the application of sufficient heat thereto (and cooling with air, if necessary), and the substrate material may produce an aerosol that is "smoke-like." In other aspects, the substrate material may produce an aerosol that is substantially non-visible but is recognized as present by other characteristics, such as flavor or texture. Thus, the nature of the produced aerosol may be variable depending upon the specific components of the aerosol delivery component. The aerosol may be chemically simple relative to the chemical nature of the smoke produced by burning tobacco.

In some implementations, the aerosol precursor composition may comprise one or more humectants such as, for example, propylene glycol, glycerin, and/or the like. In various implementations, the amount of the aerosol precursor composition that is used within the aerosol delivery device may be such that the aerosol delivery device exhibits acceptable sensory and organoleptic properties, and desirable performance characteristics. For example, in some implementations the aerosol precursor composition (such as, for example, glycerin and/or propylene glycol), may be employed in order to provide for the generation of a visible mainstream aerosol that in many regards resembles the appearance of tobacco smoke. For example, the amount of aerosol precursor composition incorporated into the substrate material of the smoking article may be in the range of about 4.5 grams or less, 3.5 grams or less, about 3 grams or less, about 2.5 grams or less, about 2 grams or less, about 1.5 grams or less, about 1 gram or less, or about 0.5 gram or less. It should be noted, however, that in other implementations values outside of these ranges are possible.

In some implementations, the aerosol precursor composition, also referred to as a vapor precursor composition or "e-liquid," may comprise a variety of components including, by way of example, a polyhydric alcohol (e.g., glycerin, propylene glycol, or a mixture thereof), nicotine, tobacco, tobacco extract, and/or flavorants. Some possible types of aerosol precursor components and formulations are set forth and characterized in U.S. Pat. No. 7,217,320 to Robinson et al. and U.S. Pat. App. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al., the disclosures of which are incorporated herein by reference in their entireties. Other aerosol precursors that may be employed include the aerosol precursors that have been incorporated in VUSE® products by R. J. Reynolds Vapor Company, the BLU™ products by Fontem Ventures B.V., the MISTIC MENTHOL product by Mistic Ecigs, MARK TEN products by Nu Mark LLC, the JUUL product by Juul Labs, Inc., and VYPE products by CN Creative Ltd. Also possible are the so-called "smoke juices" for electronic cigarettes that have been available from Johnson Creek Enterprises LLC. Still further examples of possible aerosol precursor compositions are sold under the brand names BLACK NOTE, COSMIC FOG, THE MILKMAN E-LIQUID, FIVE PAWNS, THE VAPOR CHEF, VAPE WILD, BOOSTED, THE STEAM FACTORY, MECH SAUCE, CASEY JONES MAINLINE RESERVE, MITTEN VAPORS, DR. CRIMMY'S V-LIQUID, SMILEY E LIQUID, BEANTOWN VAPOR, CUTTWOOD, CYCLOPS VAPOR, SICBOY, GOOD LIFE VAPOR, TELEOS, PINUP VAPORS, SPACE JAM, MT. BAKER VAPOR, and JIMMY THE JUICE MAN.

The amount of aerosol precursor that is incorporated within the substrate material may be such that the aerosol generating piece provides acceptable sensory and desirable performance characteristics. For example, it may be desired that sufficient amounts of aerosol forming material be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating piece. In one or more embodiments, about 0.5 ml or more, about 1 ml or more, about 2 ml or more, about 5 ml or more, or about 10 ml or more of the aerosol precursor composition may be included.

In some of the examples described above, the aerosol precursor composition comprises a glycerol-based liquid. In other implementations, however, the aerosol precursor composition may be a water-based liquid. In some implementations, the water-based liquid may be comprised of more than approximately 80% water. For example, in some implementations the percentage of water in the water-based liquid may be in the inclusive range of approximately 90% to approximately 93%. In some implementations, the water-based liquid may include up to approximately 10% propylene glycol. For example, in some implementations the percentage of propylene glycol in the water-based liquid may be in the inclusive range of approximately 4% to approximately 5%. In some implementations, the water-based liquid may include up to approximately 10% flavorant. For example, in some implementations the percentage of flavorant(s) of the water-based liquid may be in the inclusive range of approximately 3% to approximately 7%. In some implementations, the water-based liquid may include up to approximately 1% nicotine. For example, in some implementations the percentage nicotine in the water-based liquid may be in the inclusive range of approximately 0.1% to approximately 1%. In some implementations, the water-based liquid may include up to approximately 10% cyclodextrin. For example, in some implementations the percentage cyclodextrin in the water-based liquid may be in the inclusive range of approximately 3% to 5%. In still other implementations, the aerosol precursor composition may be a combination of a glycerol-based liquid and a water-based liquid. For example, some implementations may include up to approximately 50% water and less than approximately 20% glycerol. The remaining components may include one or more of propylene glycol, flavorants, nicotine, cyclodextrin, etc. Some examples of water-based aerosol precursor compositions that may be suitable are disclosed in GB 1817863.2, filed Nov. 1, 2018, titled Aerosolisable Formulation; GB 1817864.0, filed Nov. 1, 2018, titled Aerosolisable Formulation; GB 1817867.3, filed Nov. 1, 2018, titled Aerosolisable Formulation; GB 1817865.7, filed Nov. 1, 2018, titled Aerosolisable Formulation; GB 1817859.0, filed Nov. 1, 2018, titled Aerosolisable Formulation; GB 1817866.5, filed Nov. 1, 2018, titled Aerosolisable Formulation; GB 1817861.6, filed Nov. 1, 2018, titled Gel and Crystalline Powder; GB 1817862.4, filed Nov. 1, 2018, titled Aerosolisable Formulation; GB 1817868.1, filed Nov. 1, 2018, titled Aerosolised Formulation; and GB 1817860.8, filed Nov. 1, 2018, titled Aerosolised Formulation, each of which is incorporated by reference herein in its entirety.

In some implementations, the aerosol precursor composition may incorporate nicotine, which may be present in various concentrations. The source of nicotine may vary, and the nicotine incorporated in the aerosol precursor composition may derive from a single source or a combination of two or more sources. For example, in some implementations the aerosol precursor composition may include nicotine derived from tobacco. In other implementations, the aerosol precursor composition may include nicotine derived from other organic plant sources, such as, for example, non-tobacco plant sources including plants in the Solanaceae family. In other implementations, the aerosol precursor composition may include synthetic nicotine. In some implementations, nicotine incorporated in the aerosol precursor composition may be derived from non-tobacco plant sources, such as other members of the Solanaceae family. The aerosol precursor composition may additionally or alternatively include other active ingredients including, but not limited to, botanical ingredients (e.g., lavender, peppermint, chamomile, basil, rosemary, thyme, eucalyptus, ginger, cannabis, ginseng, maca, and tisanes), melatonin, stimulants (e.g., caffeine, theine, and guarana), amino acids (e.g., taurine, theanine, phenylalanine, tyrosine, and tryptophan) and/or pharmaceutical, nutraceutical, nootropic, psychoactive, and medicinal ingredients (e.g., vitamins, such as B6, B12, and C and cannabinoids, such as tetrahydrocannabinol (THC) and cannabidiol (CBD)). It should be noted that the aerosol precursor composition may comprise any constituents, derivatives, or combinations of any of the above. The particular percentages and choice of ingredients will vary depending upon the desired flavor, texture, and other characteristics. Example active ingredients would include any ingredient known to impact one or more biological functions within the body, such as ingredients that furnish pharmacological activity or other direct effect in the diagnosis, cure, mitigation, treatment, or prevention of disease, or which affect the structure or any function of the body of humans or other animals (e.g., provide a stimulating action on the central nervous system, have an energizing effect, an antipyretic or analgesic action, or an otherwise useful effect on the body).

As noted herein, the aerosol precursor composition may comprise or be derived from one or more botanicals or constituents, derivatives, or extracts thereof. As used herein, the term "botanical" includes any material derived from plants including, but not limited to, extracts, leaves, bark, fibres, stems, roots, seeds, flowers, fruits, pollen, husk, shells or the like. Alternatively, the material may comprise an active compound naturally existing in a botanical, obtained synthetically. The material may be in the form of liquid, gas, solid, powder, dust, crushed particles, granules, pellets, shreds, strips, sheets, or the like. Example botanicals are tobacco, eucalyptus, star anise, hemp, cocoa, cannabis, fennel, lemongrass, peppermint, spearmint, rooibos, chamomile, flax, ginger, *Ginkgo biloba*, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha* Arventis, *Mentha* c.v., *Mentha niliaca, Mentha piperita, Mentha piperita citrata* c.v., *Mentha piperita* c.v, *Mentha spicata crispa, Mentha cardifolia, Mentha longifolia, Mentha suaveolens variegata, Mentha pulegium, Mentha spicata* c.v. and *Mentha suaveolens*.

As noted above, in various implementations, the aerosol precursor composition may include a flavorant or materials that alter the sensory or organoleptic character or nature of the aerosol of the smoking article. In some implementations, the flavorant may be pre-mixed with the liquid. In other implementations, the flavorant may be delivered separately downstream from the heat source as a main or secondary flavor. Still other implementations may combine a pre-mixed flavorant with a downstream flavorant. As used herein, reference to a "flavorant" refers to compounds or components that can be aerosolized and delivered to a user and which impart a sensory experience in terms of taste and/or aroma. Example flavorants include, but are not limited to, vanillin, ethyl vanillin, cream, tea, coffee, fruit (e.g., apple, cherry, strawberry, peach and citrus flavors, including lime, lemon, mango, and other citrus flavors), maple, menthol, mint, peppermint, spearmint, wintergreen, nutmeg, clove, lavender, cardamom, ginger, honey, anise, sage, rosemary, hibiscus, rose hip, yerba mate, guayusa, honeybush, rooibos, amaretto, mojito, yerba santa, ginseng, chamomile, turmeric, bacopa monniera, gingko biloba, withania somnifera, cinnamon, sandalwood, jasmine, cascarilla, cocoa, licorice, and flavorings and flavor packages of the type and character traditionally used for the flavoring of cigarette, cigar, and pipe tobaccos. Other examples include flavorants derived from, or simulating, burley, oriental tobacco, flue cured tobacco, etc. Syrups, such as high fructose corn syrup, also can be employed. Example plant-derived compositions that may be suitable are disclosed in U.S. Pat. No. 9,107,453 and U.S. Pat. App. Pub. No. 2012/0152265 both to Dube et al., the disclosures of which are incorporated herein by reference in their entireties. The selection of such further components are variable based upon factors such as the sensory characteristics that are desired for the smoking article, and the present disclosure is intended to encompass any such further components that are readily apparent to those skilled in the art of tobacco and tobacco-related or tobacco-derived products. See, e.g., Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties. It should be noted that reference to a flavorant should not be limited to any single flavorant, and may, in fact, represent a combination of one or more flavorants.

As used herein, the terms "flavor," "flavorant," "flavoring agents," etc. may also refer to materials which, where local regulations permit, may be used to create a desired taste, aroma, or other somatosensorial sensation in a product for adult consumers. They may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha*, eucalyptus, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas.

In some implementations, the flavorant comprises menthol, spearmint and/or peppermint. In some embodiments, the flavorant comprises flavor components of cucumber, blueberry, citrus fruits and/or redberry. In some embodiments, the flavorant comprises eugenol. In some embodiments, the flavorant comprises flavor components extracted from tobacco. In some embodiments, the flavorant comprises flavor components extracted from cannabis.

In some implementations, the flavorant may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The selection of such further components may be variable based upon factors such as the sensory characteristics that are desired for the smoking article, and the present disclosure is intended to encompass any such further components that are readily apparent to those skilled in the art of tobacco and tobacco-related or tobacco-derived products. See, Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties.

A wide variety of types of flavoring agents, or materials that alter the sensory or organoleptic character or nature of the mainstream aerosol of the smoking article may be suitable to be employed. In some implementations, such flavoring agents may be provided from sources other than tobacco and may be natural or artificial in nature. For example, some flavoring agents may be applied to, or incorporated within, the substrate material and/or those regions of the smoking article where an aerosol is generated. In some implementations, such agents may be supplied directly to a heating cavity or region proximate to the heat source or are provided with the substrate material. Example flavoring agents may include, for example, vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, may also be suitable to be employed.

Flavoring agents may also include acidic or basic characteristics (e.g., organic acids, such as levulinic acid, succinic acid, pyruvic acid, and benzoic acid). In some implementations, flavoring agents may be combinable with the elements of the substrate material if desired. Example plant-derived compositions that may be suitable are disclosed in U.S. Pat. No. 9,107,453 and U.S. Pat. App. Pub. No. 2012/0152265 both to Dube et al., the disclosures of which are incorporated herein by reference in their entireties. Any of the materials, such as flavorings, casings, and the like that may be useful in combination with a tobacco material to affect sensory properties thereof, including organoleptic properties, such as described herein, may be combined with the substrate material. Organic acids particularly may be able to be incorporated into the substrate material to affect the flavor, sensation, or organoleptic properties of medicaments, such as nicotine, that may be able to be combined with the substrate material. For example, organic acids, such as levulinic acid, lactic acid, and pyruvic acid, may be included in the substrate material with nicotine in amounts up to being equimolar (based on total organic acid content) with the nicotine. Any combination of organic acids may be suitable. For example, in some implementations, the substrate material may include approximately 0.1 to about 0.5 moles of levulinic acid per one mole of nicotine, approximately 0.1 to about 0.5 moles of pyruvic acid per one mole of nicotine, approximately 0.1 to about 0.5 moles of lactic acid per one mole of nicotine, or combinations thereof, up to a concentration wherein the total amount of organic acid present is equimolar to the total amount of nicotine present in the substrate material. Various additional examples of organic acids that may be employed to produce a substrate material are described in U.S. Pat. App. Pub. No. 2015/0344456 to Dull et al., which is incorporated herein by reference in its entirety.

In some implementations, the substrate material may include other materials having a variety of inherent characteristics or properties. For example, the substrate material may include a plasticized material or regenerated cellulose in the form of rayon. As another example, viscose (commercially available as VISIL®), which is a regenerated cellulose product incorporating silica, may be suitable. Some carbon fibers may include at least 95 percent carbon or more. Similarly, natural cellulose fibers such as cotton may be suitable, and may be infused or otherwise treated with silica, carbon, or metallic particles to enhance flame-retardant properties and minimize off-gassing, particularly of any undesirable off-gassing components that would have a negative impact on flavor (and especially minimizing the likelihood of any toxic off-gassing products). Cotton may be treatable with, for example, boric acid or various organophosphate compounds to provide desirable flame-retardant properties by dipping, spraying or other techniques known in the art. These fibers may also be treatable (coated, infused, or both by, e.g., dipping, spraying, or vapor-deposition) with organic or metallic nanoparticles to confer the desired property of flame-retardancy without undesirable off-gassing or melting-type behavior.

As noted above, the substrate portion of the present disclosure also includes a susceptor material. In various implementations, the susceptor material may comprise a ferromagnetic material including, but not limited to, cobalt, iron, nickel, zinc, manganese, and any combinations thereof. In other implementations, the susceptor material may comprise other materials, including, for example, other metal materials such as aluminum or stainless steel, as well as ceramic materials such as silicon carbide, carbonaceous materials, and any combinations of any of the materials described above. In still other implementations, the susceptor material may comprise other conductive materials including metals such as copper, alloys of conductive materials, or other materials with one or more conductive materials imbedded therein. In some implementations, the susceptor material may comprise a granulated susceptor component, including, but not limited to a shredded susceptor material. In other implementations, a granulated susceptor material may comprise susceptor particles, susceptor beads, etc.

In various implementations, the proportion of the susceptor material to substrate material may vary. For example, in some implementations the ratio of susceptor material to substrate material may be approximately 50/50 (e.g., 50% susceptor material and 50% substrate material by volume, or by weight, etc.), in other implementations the ratios may be different. For example, in some implementations the ratio of susceptor material to substrate material may be approximately 10/90, 20/80, 30/70, 40/60, 60/40, 70/30, 80/20, 90/10, or any ratio in between. Additional components may also be present in the substrate portion. In the depicted implementation, the mixture of substrate material and susceptor material is deposited by an additive manufacturing device into a predefined shape. For example, the predefined shape of the depicted implementation is substantially cylindrical. As noted above, however, a variety of other shapes are possible.

Although the substrate portion 205 of the implementation depicted in FIG. 3 appears as a single segment, the substrate portion of other implementations may include multiple (e.g., two or more) segments. In various implementations, one or more of the segments of a substrate portion may differ in one or more respects from one or more of the other segments of the substrate portion. For example, in various implementations one or more segments of a substrate portion may be different from one or more other segments of the substrate portion with respect to one or more characteristics. Such characteristics may include, but need not be limited to, compositions of the segments (including material compositions and/or ratios of materials), shapes of the segments, sizes of the segments, etc.

Another example implementation of a substrate portion of the present disclosure is illustrated in FIG. 4. Although the shape of a substrate portion and number of segments thereof may differ, the substrate portion 305 of the depicted implementation has a substantially cylindrical shape and includes four segments. In particular, the substrate portion 305 of the depicted implementation includes four segments 330A, 330B, 330C, 330D, which are arranged along a longitudinal length of the substrate portion 305. In the depicted implementation, the segments 330A, 330B, 330C, 330D (and thus the substrate portion 305) are formed via additive manufacturing (such as, for example, via 3D printing). In some implementations, the segments may comprise alternating segments of substrate material and susceptor material. For example, one segment (e.g., segment 330A in the depicted implementation) may substantially comprise substrate material, and a longitudinally adjacent segment (e.g., segment 330B) may substantially comprise susceptor material. Likewise, the next longitudinally adjacent segment (e.g., segment 330C) may substantially comprise substrate material, and the longitudinally adjacent segment (e.g., segment 330D) may substantially comprise susceptor material. In other implementations, the positions of the segments may differ, such as being reversed and/or reordered, and there may be more or less segments of each kind. In another example implementation, each of the segments may include both substrate material and susceptor material and the ratios of the susceptor material to substrate material may differ among one or more of the segments. In another example implementation, one or more of the segments may include different susceptor materials. In another example implementation, one or more of the segments may include a different amount of aerosol precursor composition. In another example implementation, one or more of the segments may include a different substrate material and/or flavorant.

Another example implementation of a substrate portion of the present disclosure is illustrated in FIG. 5. Although in various implementations the shape of a substrate portion and number of segments thereof may differ, the substrate portion 405 of the depicted implementation has a substantially cylindrical shape and includes four segments. In particular, the substrate portion 405 of the depicted implementation includes four segments 430A, 430B, 430C, 430D, which are arranged radially from the center of the substrate portion 405 outward. In the depicted implementation, the segments 430A, 430B, 430C, 430D (and thus the substrate portion 405) are formed via additive manufacturing (such as, for example, via 3D printing). In some implementations, the segments may comprise alternating segments of substrate material and susceptor material. For example, one segment (e.g., segment 430A in the depicted implementation) may substantially comprise substrate material, and a radially adjacent segment (e.g., segment 430B) may substantially comprise susceptor material. Likewise, the next radially adjacent substrate segment (e.g., segment 430C) may substantially comprise substrate material, and the radially adjacent substrate segment (e.g., segment 430D) may substantially comprise susceptor material. In other implementations, the positions of the segments may differ, such as being reversed and/or reordered, and there may be more or less segments of each kind. In another example implementation, each of the segments may include both substrate material and susceptor material and the ratios of the susceptor material to substrate material may differ among one or more of the segments. In another example implementation, one or more of the segments may include different susceptor materials. In another example implementation, one or more of the segments may include a different amount of aerosol precursor composition. In another example implementation, one or more of the segments may include a different substrate material and/or flavorant.

Another example implementation of a substrate portion of the present disclosure is illustrated in FIG. 6. Although in various implementations the shape of a substrate portion and number of segments thereof may differ, the substrate portion 505 of the depicted implementation has a substantially cylindrical shape and includes two segments. In particular, the substrate portion 505 of the depicted implementation includes two substrate segments 530A, 530B, which represent respective semicylinder segments of the substrate portion 505. In the depicted implementation, the segments 530A, 530B (and thus the substrate portion 505) are formed via additive manufacturing (such as, for example, via 3D printing). In some implementations, the segments may comprise one segment of substrate material and one segment of susceptor material. For example, one segment (e.g., segment 530A in the depicted implementation) may substantially comprise substrate material, and the other segment (e.g., segment 530B) may substantially comprise susceptor material. In other implementations, the positions of the segments may differ, such as being reversed and/or reordered, and there may be more or less segments of each kind. In another example implementation, each of the segments may include both substrate material and susceptor material and the ratios of the susceptor material to substrate material may differ among one or more of the segments. In another example implementation, one or more of the segments may include different susceptor materials. In another example implementation, one or more of the segments may include a different amount of aerosol precursor composition. In another example implementation, one or more of the segments may include a different substrate material and/or flavorant.

Another example implementation of a substrate portion of the present disclosure is illustrated in FIG. 7. As noted above, in various implementations a substrate portion of the present disclosure may have a variety of different shapes. In the implementation depicted in FIG. 7, the substrate portion 605 has a substantially cuboidal shape. In the depicted implementation, the substrate portion 605 includes a mixture of substrate material and susceptor material that together are formed into the substrate portion 605 via additive manufacturing (such as, for example, via 3D printing).

Another example implementation of a substrate portion of the present disclosure is illustrated in FIG. 8. Although in various implementations the shape of a substrate portion and number of segments thereof may differ, the substrate portion 705 of the depicted implementation has a substantially cuboidal shape and includes two substrate segments. In particular, the substrate portion 705 of the depicted implementation includes two substrate segments 730A, 730B, which represent respective half cuboidal segments of the substrate portion 705. In the depicted implementation, the segments 730A, 730B (and thus the substrate portion 705) are formed via additive manufacturing (such as, for example, via 3D printing). In some implementations, the segments may comprise one segment of substrate material and one segment of susceptor material. For example, one segment (e.g., segment 730A in the depicted implementation) may substantially comprise substrate material, and the other segment (e.g., segment 730B) may comprise substantially susceptor material. In other implementations, the positions of the segments may differ, such as being reversed and/or reordered, and there may be more or less segments of each kind. In another example implementation, each of the segments may include both substrate material and susceptor material and the ratios of the susceptor material to substrate material may differ among one or more of the segments. In another example implementation, one or more of the segments may include different susceptor materials. In another example implementation, one or more of the segments may include a different amount of aerosol precursor composition. In another example implementation, one or more of the segments may include a different substrate material and/or flavorant.

It should be noted that although the control body and the aerosol source member of the present disclosure may be provided together as a complete aerosol delivery device generally, the components may also be provided separately. Accordingly, any discussion otherwise provided herein in relation to the components in combination should also be understood as applying to the control body and the aerosol source member as individual and separate components. The present disclosure also encompasses a disposable unit for use with a reusable unit. In specific implementations, such a disposable unit (which may, in some implementations, be an aerosol source member) can be configured to be received into a reusable unit (which may, in some implementations, be a control body). In other implementations, both units may be disposable. For example, in specific implementations both the control body and the aerosol source member may be disposable.

In another aspect, the present disclosure may be directed to kits that provide a variety of components as described herein. For example, a kit may comprise a control body with one or more aerosol source members. A kit may further comprise a control body with one or more charging components. A kit may further comprise a control body with one or more power sources. A kit may further comprise a control body with one or more aerosol source members and one or more charging components and/or one or more power sources. In further implementations, a kit may comprise a plurality of aerosol source members. A kit may further comprise a plurality of aerosol source members and one or more power sources and/or one or more charging components. The inventive kits may further include a case (or other packaging, carrying, or storage component) that accommodates one or more of the further kit components. The case could be a reusable hard or soft container. Further, the case could be simply a box or other packaging structure.

Many modifications and other implementations of the disclosure will come to mind to one skilled in the art to which this disclosure pertains having the benefit of the teachings presented in the foregoing descriptions and the associated drawings. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

What is claimed is:

1. A method of manufacturing an aerosol source member, the method comprising:
    providing at least one substrate material;
    providing at least one resonant receiver comprising at least one susceptor material;
    mixing the at least one susceptor material with the at least one substrate material; and
    forming a substrate portion comprising both the at least one substrate material and the at least one resonant receiver comprising at least one susceptor material using additive manufacturing.

2. The method of claim 1, wherein the at least one susceptor material comprises a carbonaceous material.

3. The method of claim 2, wherein the carbonaceous material comprises a granular carbonaceous material.

4. The method of claim 1, wherein the substrate portion comprises two or more substrate materials.

5. The method of claim 1, wherein the substrate portion comprises two or more susceptor materials.

6. The method of claim 1, wherein the step of forming a substrate portion comprises forming a substrate portion comprising two or more segments.

7. The method of claim 6, wherein each segment includes a different aerosol precursor composition.

8. The method of claim 1, wherein the at least one susceptor material and the at least one substrate material comprise layers in the substrate portion.

9. The method of claim 1,
    wherein the at least one susceptor material and the at least one substrate material comprise layers in the substrate portion, and
    wherein the at least one susceptor material layer and the at least one substrate material layer are formed in an alternating pattern.

10. The method of claim 1, wherein the ratio of the susceptor material to the substrate material is even.

* * * * *